United States Patent [19]

Bowen et al.

[11] Patent Number: 4,676,588
[45] Date of Patent: Jun. 30, 1987

[54] FIBER OPTIC CONNECTOR

[75] Inventors: Terry P. Bowen, Etters; Douglas W. Glover, Harrisburg, both of Pa.

[73] Assignee: AMP Incorporated, Harrisburg, Pa.

[21] Appl. No.: 500,053

[22] Filed: Jun. 1, 1983

[51] Int. Cl.[4] .............................................. G02B 6/38
[52] U.S. Cl. ................................ 350/96.21; 350/96.15
[58] Field of Search ............... 350/96.15, 96.20, 96.21, 350/96.22, 96.29

[56] References Cited

U.S. PATENT DOCUMENTS

| 3,734,594 | 5/1973 | Trambarulo | 350/96 B |
|---|---|---|---|
| 3,936,142 | 2/1976 | Kersten | 350/96.21 |
| 3,990,779 | 11/1976 | McCartney | 350/96.21 |
| 4,030,810 | 6/1977 | Khoe | 350/96.20 |
| 4,121,884 | 10/1978 | Greenwood | 350/96.15 |
| 4,178,067 | 12/1979 | Johnson et al. | 350/96.21 |
| 4,186,996 | 2/1980 | Bowen et al. | 350/96.20 |
| 4,418,983 | 12/1983 | Bowen et al. | 350/96.21 |
| 4,448,483 | 5/1984 | Ryley, Jr. | 350/96.21 |
| 4,458,983 | 7/1984 | Roberts | 350/96.20 |

FOREIGN PATENT DOCUMENTS

| 30110 | 3/1981 | Japan | 350/96.20 |
|---|---|---|---|
| 2038015 | 7/1980 | United Kingdom | 350/96.21 |

OTHER PUBLICATIONS

Japanese Patent Publication Application No. Sho 54/1979-106213 (translation).

*Primary Examiner*—William L. Sikes
*Assistant Examiner*—Frank González
*Attorney, Agent, or Firm*—Adrian J. LaRue; Anton P. Ness

[57] ABSTRACT

A fiber optic connector comprises a rigid housing member having a passageway therethrough of continuous diameter and ferrule members of relatively rigid yet resiliently deformable material having a bore of a dimension to receive exposed ends of fiber optic transmission members of fiber optic cables therein while the diameter of the external surface of the ferrule members is greater than the diameter of the passageway so that forcible movement of the ferrule members along the passageway until they abut therein causes radial deformation of the ferrule members to frictionally and compressibly engage the housing member and the exposed ends of the fiber optic transmission members thereby securing the fiber optic transmission members within the passageway in axial alignment.

11 Claims, 4 Drawing Figures

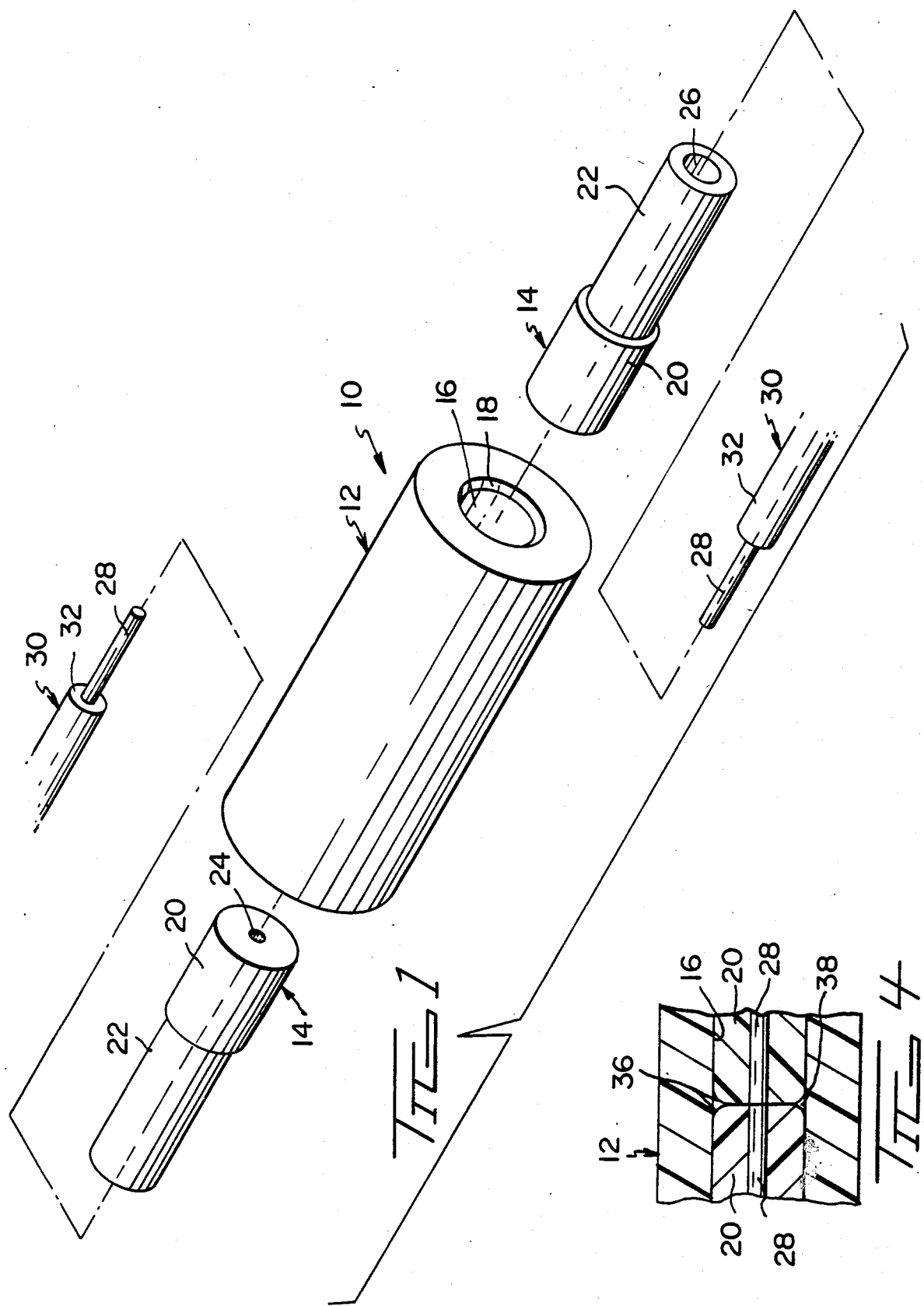

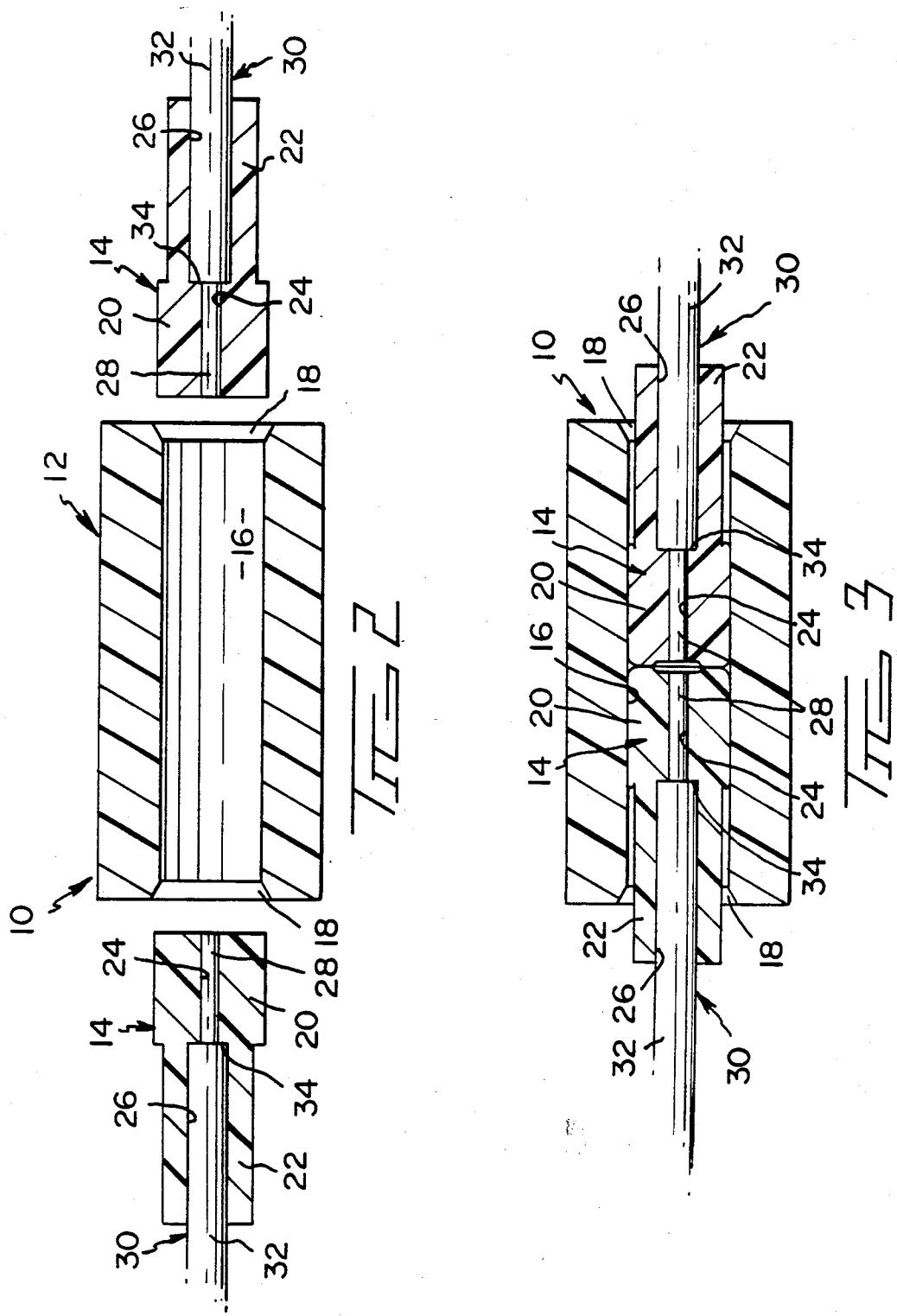

FIBER OPTIC CONNECTOR

FIELD OF THE INVENTION

This invention relates to connectors and more particularly to connectors for connecting fiber optic transmission members together.

BACKGROUND OF THE INVENTION

When ends of fiber optic transmission members are connected together, accurate alignment between the fiber ends is extremely important to prevent light loss so that transmission of the light along the fiber optic transmission members is at an optimum thereby resulting in highly efficient transmission of signal information.

Thus, it is highly important that a connector for connecting ends of fiber optic transmission members provides accurate alignment of the fiber optic transmission members with forgiving tolerances to provide optimum light transmission, establishes a snug fit to seal the connection, is low cost, and is easily applied without the use of tools.

SUMMARY OF THE INVENTION

According to the present invention, a fiber optic connector comprises a rigid housing member having a passageway therethrough of continuous diameter and ferrule members of relatively rigid yet resiliently deformable material having a bore of a dimension to receive exposed ends of fiber optic transmission members of fiber optic cables therein while the diameter of the external surface of the ferrule members is greater than the diameter of the passageway so that forcible movement of the ferrule members along the passageway until they abut therein causes radial deformation of the ferrule members to frictionally and compressibly engage the housing member and the exposed ends of the fiber optic transmission members thereby securing the fiber optic transmission members within the passageway in axial alignment.

BRIEF DESCRIPTION OF THE DRAWINGS

FIG. 1 is an exploded and perspective view of parts of the fiber optic connector and stripped ends of fiber optic cables to be connected therein.

FIG. 2 is a cross-sectional view of FIG. 1 with the stripped ends of the fiber optic cables positioned in the resilient members and exploded from the housing member.

FIG. 3 is a cross-sectional view similar to FIG. 2 showing an assembled fiber optic connector.

FIG. 4 is a view similar to FIG. 3 showing an alternative embodiment.

DETAILED DESCRIPTION OF THE INVENTION

FIGS. 1 through 3 illustrate fiber optic connector 10 which comprises a rigid housing member 12 and resilient ferrule members 14. Rigid housing member 12 is made from any suitable metal or plastic material and has a passageway 16 extending therethrough of a constant continuous diameter while entrances to passageway 16 have beveled surfaces 18. The exterior surface of housing member 12 can be circular or take any other configuration as desired and necessary.

Resilient ferrule members 14 are fabricated from a suitable plastic material such as, for example, any of the polyesters or polyphenylene sulfides. The material is relatively rigid yet is sufficiently resiliently deformable to allow radial compression of the first section 20 when positioned in passageway 16 of housing member 12. Ferrule members 14 also include second sections 22 extending rearwardly of first sections 20. First sections 20 have a bore 24 extending therethrough and second sections 22 have a bore 26 extending therethrough. Bore 24 has a diameter to permit an exposed end of a fiber optic transmission member 28 to be positioned therein while outer jacket 32 of cable 30 is positioned in bore 26 of second section 22 as shown in FIGS. 2 and 3. Fiber optic transmission members 28 can be either glass or plastic; they are typically covered by a cladding material to protect them which can be removed if desired prior to the exposed ends of fiber optic transmission members 28 being positioned in bores 24 and first sections 20 of ferrule members 14. The thickness of the cladding material is quite small so that bore 24 can be of a dimension to accommodate exposed ends of fiber optic transmission members 28 either with or without the cladding material. As can be discerned, outer jacket 32 of cable 30 is disposed in bore 26 of second section 22 and engages stop surface 34 limiting movement of cable 30 into ferrule member 14.

After the stripped ends of fiber optic cables 30 have been positioned in bores 24 and 26 of ferrule members 14, the sections of transmission members 28 extending outwardly beyond the front surface of ferrule members 14 are cleaved or cut to coincide with the front surfaces, whereafter they are polished flush with these front surfaces. If desired, an adhering material such as epoxy resin or the like can be placed in bores 24 and 26 to adhesively secure cables 30 therein. After cables 30 have been positioned in bores 24 and 26 of ferrule members 14, they can now be positioned in passageway 16 of rigid housing member 12 as shown in FIG. 3. The external diameter of first sections 20 of ferrule members 14 are slightly greater than the diameter of passageway 16 and are the portions of largest diameter of ferrule members 14 being inserted into passageway 16, whereas second sections 22 are of less diameter and are not in engagement with passageway 16 of housing member 12. Ferrule members 14 are positioned in passageway 16 with beveled surfaces 18 forming lead-ins facilitating the insertion of first sections 20 thereinto. Forcible movement of ferrule members 14 along passageway 16 causes sections 20 to compress inwardly into tight engagement with transmission members 28 in bores 24 and this causes resilient radial deformation thereof which biases the transmission members 28 to a stable position within passageway 16 causing the transmission members 28 to be in coincident axial alignment. As can be discerned from FIG. 3, radial compression of sections 20 of ferrule members 14 causes a small amount of bulging of the ferrule material at their front surfaces which will engage each other and provide a slight separation between the aligned trasmission members 28 to prevent abrasion of their polished ends against each other. The tight engagement between sections 20 of ferrule members 14 and passageway 16 results in a sealed connection between the axially aligned transmission members 28 thereby resulting in optimum light transmission therebetween. Sections 22 provide strain relief for cables 30. If desired, a fluid having the same index of refraction as that of the fiber optic transmission members can be located between the facing front ends of sections 20 to enhance light transmission between the fiber optic transmission members 28.

FIG. 4 shows an alternative embodiment wherein the front surfaces of sections 20 have radiussed peripheral surfaces 36 which form a reservoir 38 when the front surfaces abut each other in passageway 16 of housing member 12. Reservoir 38 allows sections 20 to expand and contract thereinto as a result of temperature variations and, if an index-matching liquid is used, it can move into and out of the reservoir 38 depending on the temperature. The liquid enhances the transmission of light between the axially aligned fiber optic transmission members 28 and protects them. Reservoir 38 also collects foreign particles to keep them away from the interface between the ends of the transmission members.

The fiber optic connector is of simplified construction, is low cost, and is easily applied without the use of tools. The material of the resilient ferrule members 14 is tolerance forgiving because of its simplified construction.

We claim:

1. A fiber optic connector for connecting ends of fiber optic transmission members of fiber optic cables together, comprising:
a rigid housing member having a passageway therethrough of a constant continuous diameter therealong; and
ferrule members capable of resilient deformation, each member having a bore therethrough to receive an end of a respective fiber optic transmission member and each member having at least a first section, the portion of said bore in said first section having a dimension to receive an exposed end of said respective fiber optic transmission member therein, the diameter of the external surface of said first section being the largest diameter of said ferrule member within said passageway and being greater than the diameter of said passageway so that forcible movement of a said ferrule member along the passageway causes said first section thereof to frictionally and compressibly be engaged and radially deformed by the surface forming the passageway securing said ferrule member in said housing member thereby and to engage the exposed end of the fiber optic transmission member thereby securing both the fiber optic transmission members within the passageway and biasing them to a stable position causing them to be in coincident axial alignment.

2. A fiber optic connector as set forth in claim 1, wherein said ferrule members have second sections in which outer jackets of the fiber optic cables are to be disposed to provide a strain relief.

3. A fiber optic connector as set forth in claim 2, wherein the diameter of the external surfaces of the second sections is less than that of the first sections such that said second sections are unengaged by said housing passageway.

4. A fiber optic connector as set forth in claim 1, wherein front surfaces of said ferrule members are disposed adjacent each other within said passageway and bulges occur at said front surfaces as a result of radial deformation when said ferrule members are positioned in said passageway, said bulges engage each other in said passageway spacing ends of the fiber optic transmission members slightly from each other.

5. A fiber optic connector as set forth in claim 1, wherein radiussed surfaces are located at the periphery of said front surfaces which form a reservoir within the passageway when the front surfaces engage each other, permitting expansion of at least said first sections thereinto as a result of temperature variations.

6. A fiber optic connector as set forth in claim 5 wherein index-matching fluid is disposed between said front surfaces of said ferrule members capable of expanding into said reservoir as a result of temperature variations.

7. A fiber optic connector as set forth in claim 2 wherein the portion of said bore in said second section of a said ferrule member has a stop surface to receive thereagainst a forward end of a respective said outer jacket of a respective said fiber optic transmission member inserted thereinto.

8. A fiber optic connector as set forth in claim 1 wherein said first sections of said ferrule members each are of a length at least several times greater than the diameter of a said end of a respective said fiber optic transmission member, and said passageway of said housing member is of a length at least as great as twice said length of a said first section whereby at least said first sections of said ferrule members are capable of being secured completely within said passageway and said ends of said fiber optic transmission members are brought into coincident axial alignment by compression of said front section of each said ferrule member by said surface of said passageway along a substantial axial length of each said fiber optic transmission member.

9. A fiber optic connector as set forth in claim 8 wherein each said ferrule member has a second section in which an outer jacket of a respective fiber optic transmission member is disposed to provide a strain relief and at least a major portion of said second section is disposed along said passageway of said housing member.

10. A fiber optic connector as set forth in claim 1 wherein said passageway has a lead-in at each end thereof to facilitate insertion of a respective said ferrule member thereinto.

11. A fiber optic connector as set forth in claim 1 wherein said housing member is tubular.

* * * * *